United States Patent
Treybig et al.

[11] 3,747,056
[45] July 17, 1973

[54] HIGH RESOLUTION REFLECTION SHOOTING WITH DATA MIXING

[75] Inventors: James Alva Treybig; Eugene Franklin Greene, Jr., both of Houston, Tex.

[73] Assignee: Texaco Inc., New York, N.Y. by said Treybig

[22] Filed: June 16, 1971

[21] Appl. No.: 153,553

[52] U.S. Cl.............. 340/15.5 MC, 340/15.5 CP, 340/15.5 CC
[51] Int. Cl............................................. G01v 1/28
[58] Field of Search............ 340/15.5 MC, 15.5 CP, 340/15.5 CC

[56] References Cited
UNITED STATES PATENTS
| | | | |
|---|---|---|---|
| 3,018,838 | 1/1962 | Hammond | 340/15.5 CP |
| 3,274,543 | 9/1966 | McCollum | 340/15.5 CP |
| 2,906,363 | 9/1959 | Clay | 340/15.5 CP |

OTHER PUBLICATIONS
Robinson, "Noise Attenuation or CDP Seismic Records etc." pg. 723-733, Geophysics, Vol. 33, No. 5, 10/68.

*Primary Examiner*—Benjamin A. Borchelt
*Assistant Examiner*—N. Moskowitz
*Attorney*—Thomas H. Whaley and Carl G. Ries

[57] ABSTRACT

An illustrative embodiment of the invention includes methods for obtaining seismic data from closely spaced subsurface reflection points using a minimal number of seismic energy generations. In the method of the invention the shot point to shot point spacing or the seismometer to seismometer spacing are varied in a systematic manner calculated to produce reflection from close, but not the same, subsurface bed interface areas. The data produced by reflections from the close subsurface bed interface areas may then be combined using data averaging techniques.

6 Claims, 11 Drawing Figures

COMMON REFLECTION
POINT SHOOTING

SHOT POINT
GEOMETRY FOR
HIGH RESOLUTION

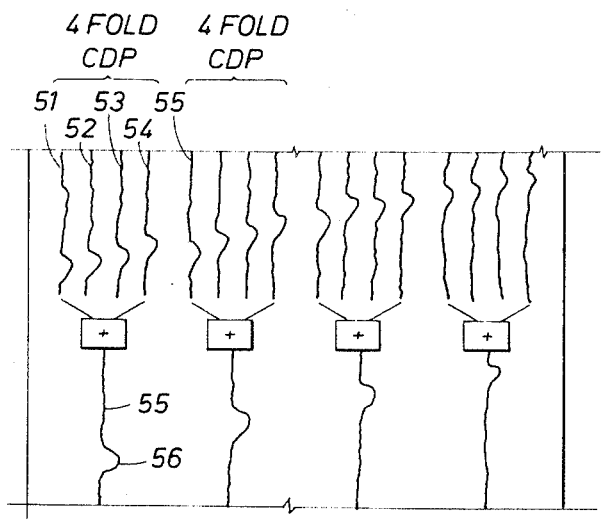
FIG. 3
PRIOR ART
CDP RECORD
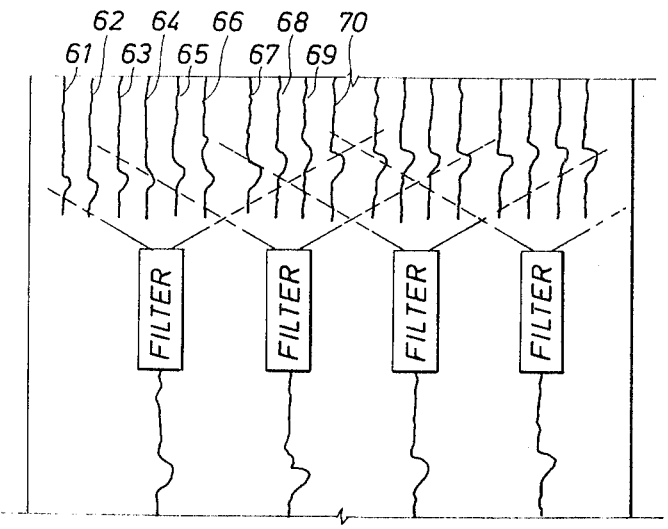
FIG. 4
HIGH RESOLUTION
RECORD
FIG. 5
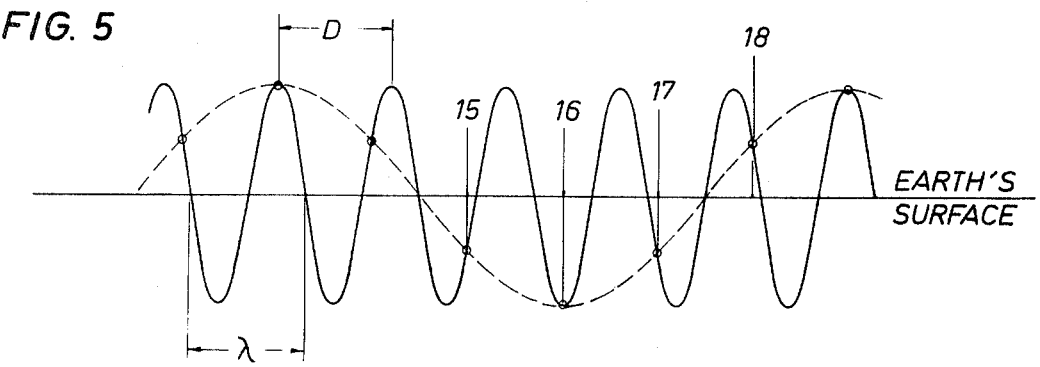

HIGH RESOLUTION REFLECTION SHOOTING WITH DATA MIXING

This invention relates to seismic exploration methods and more particularly to methods of seismic exploration in which separate seismic energy reflection records are obtained from a plurality of closely spaced but not coincident reflection points on subsurface bed interfaces which data are then processed in a manner which amplifies desired primary reflections and which minimizes vibrations on the record data caused by other seismic phenomena.

Seismic exploration relates to methods of obtaining information regarding subterranean earth formations by transmitting mechanical vibratory or acoustic energy from a point at or near the surface of the earth downwardly into subsurface formations. Seismometers or geophones spaced apart on the surface of the earth generally along a line or other predetermined curve, sense reflected or refracted seismic energy and produce an output, generally in the form of electrical signals, which are recorded in analog or digital form, on magnetic tape for example, for further analysis.

A vibrating mass or an explosive charge located on the surface or in a shallow shot hole is typically used as a source of energy for seismic exploration. Vibratory or acoustic energy from this source travels outwardly and downwardly into the earth formations and is reflected from media interfaces or discontinuities beneath the surface of the earth. The media interfaces or discontinuities causing energy reflection occur between media having acoustic impedance characteristics differing from each other. The impedance discontinuity causes a portion or component of the energy to be reflected toward the surface of the earth at each such interface. The reflected vibratory energies incident upon the geophones or seismometers at the surface are then converted into representative electrical signals which are amplified and recorded generally as a function of time and surface location of the seismometer. By timing the arrival of selected portions of the returning vibratory energy, valuable information can often be obtained regarding the depth, slope and other characteristics of subterranean earth formations.

Unfortunately, however, other vibrations or vibratory energy are normally present at the seismometer location which tend to obscure the recognition of desired reflected vibratory energy. For example, if a vibrating mass energy source is used at the surface, horizontally traveling acoustic surface waves in the upper crust layers of the earth are propogated. These surface Rayleigh or shear waves may have a component of their energy in the vertical direction. The seismometers, which are designed to discriminate against vibratory energy arriving from other than a vertical direction, are unable to distinguish the vertical component of the horizontally traveling shear waves from the vertical component of a compressional wave traveling generally in a vertical direction after being reflected from a subterranean earth formation. Moreover, these horizontally traveling waves may be reflected from surface media discontinuities such as valleys or hills. Thus multiple reflections of surface waves resulting in standing waves or interference patterns can occur and be superimposed upon the record produced by the seismometer.

Similarly, portions of the compressional wave acoustic energy coupled from the energy source into earth formations near the surface may be refracted or bent at media interfaces in such a manner that they arrive at geophones spaced horizontally along the surface from the energy source at an angle such that they have a vertical component of energy which is sensed by the seismometer array. These arriving wave fronts, having been refracted, appear no differently to the seismometer from the desired reflected energy impinging vertically on the seismometer from deeper earth formations whose characteristics it is desired to record. Thus it is apparent that there are numerous sources of noise or undesired vibratory energy capable of introducing misinformation into the record produced by a given seismometer.

In the prior art, because of these and other sources of noise in seismic data records, it has become common practice to utilize the common depth point or common reflection point method of obtaining seismic data as disclosed in U.S. Pat. No. 2,732,906. In this technique seismic energy sources are placed symmetrically about a center line between the energy source and the seismometer group in a manner such that, in the case of plane parallel subsurface interfaces, multiple reflections from substantially the same point or same small area on a media interface of subsurface earth formations are detected for each of a plurality of seismic disturbances created in performing the exploration. The multiple or redundant reflections from substantially the same reflection point impinging on the same geophone are then, after certain corrections, combined, as for example by summing, to produce a single seismic record from a given seismometer. In this record the seismic energy from a source has impinged upon substantially the same reflection point after traveling a plurality of different acoustic paths in the subterranean earth media. By averaging the data over these substantially different acoustical paths, but reflected from substantially the same point in the subterranean media, it is hoped to suppress random noise fluctuations while retaining true information indicative of the characteristics of media interfaces in the vicinity of the common subterranean reflection point.

In order to avoid the use of an undue number of seismic vibratory disturbances, multiple common depth point shots are generally made at substantially spaced intervals along the earth's surface. This introduces a shortcoming into the method, for example, in the case of discriminating against horizontally traveling vibratory energy having a vertical component such as the previously mentioned shear or Rayleigh waves. The common depth points occur at the geometric midpoint between the seismic shot point and the seismometer arrays (for the plane parallel layer case). If the common depth points are substantially spaced apart on the surface of the subterranean earth formation being investigated, it is effectively impossible to discriminate against or resolve surface disturbances having wave lengths of the order of the distance of the spacing between the common reflection points from each other on the subterranean formation. This results because of the phenomenon of aliasing or foldback.

The aliasing phenomenon arises from the fact that it is necessary to sample a traveling wave front at points occuring within its wave length in order to discern information concerning the shape of an individual wave cycle. Therefore, if surface waves travel along the upper layers of the earth between the seismometer groupings and have a wave length equal to or greater than the one-half the seismometer spacing, these waves may not be effectively cancelled by averaging the seismometer data in the manner commonly used in the common reflection point or common depth point technique due to the fact that an inconsistent sampling of the data is taken. Moreover, surface waves which have wave lengths comparable with the spacing of the seismometers may actually be reinforced or enhanced by the simple averaging technique used in the common depth point method because such waves can conceivably arrive in phase after each shot at a given seismometer location.

It is thus desirable to obtain information concerning subterranean earth formations in a manner which is not subject to the limitations of the common depth point method and which, moreover, may be used to obtain other and further information than is available by the use of the common depth point method. This may be accomplished using the principles of the present invention in which a plurality of longitudinally spaced geophone groups are used. According to the invention the shot point to geophone distance is varied unsymmetrically about the shot point/geophone center line during a series of systematically varied longitudinally spaced shots. From these shots (in the case of the parallel plane geometry) a series of close, uniformly spaced reflections from points along the acoustic interfaces of the subsurface formations are obtained. These closely spaced sample points on the subsurface interface are obtained in the present invention by spacing the shot points so that it is assured that a common depth point is not intercepted by the ray paths of the acoustic energy used to record the seismic data.

To obtain this effect in the present invention a systematic variation may be introduced in the shot point spacing. This shot point spacing variation insures reflection from points or small areas more or less uniformly spaced on the subsurface formation interface. In using roughly the same number of shot points per mile for generating acoustic energy the method of the present invention produces many times as many different sample points along the subsurface acoustic interfaces than are obtained with prior art techniques. This may be referred to as a high resolution data gathering technique.

In addition to obtaining more densely located data points of the subsurface earth formation reflection interfaces, the present invention includes improved techniques for enhancing the seismic data. These techniques include the application of spatial filters to seismic data obtained from the closely spaced subsurface reflection points. Spatial filtering techniques of varying degrees of complexity, according to the invention, are applied to seismic records or traces from adjacent densely spaced reflection points. This, in effect, averages in a weighted manner, data from a region in the vicinity of a given subsurface reflection point thus enhancing the validity of data at each such point.

The present invention, including other and further objects, features and advantages, is best understood by the following detailed description thereof when taken together with the accompanying drawings in which:

BRIEF DESCRIPTION OF THE DRAWINGS

FIG. 3 is a schematic view showing data enhancement techniques according to the prior art.

FIG. 4 is a schematic view illustrating data enchancement according to the present invention.

FIG. 5 is an illustrative view showing the effect of data gathering point geometry on signal aliasing.

DESCRIPTION OF THE PREFERRED EMBODIMENT

Figure 1:
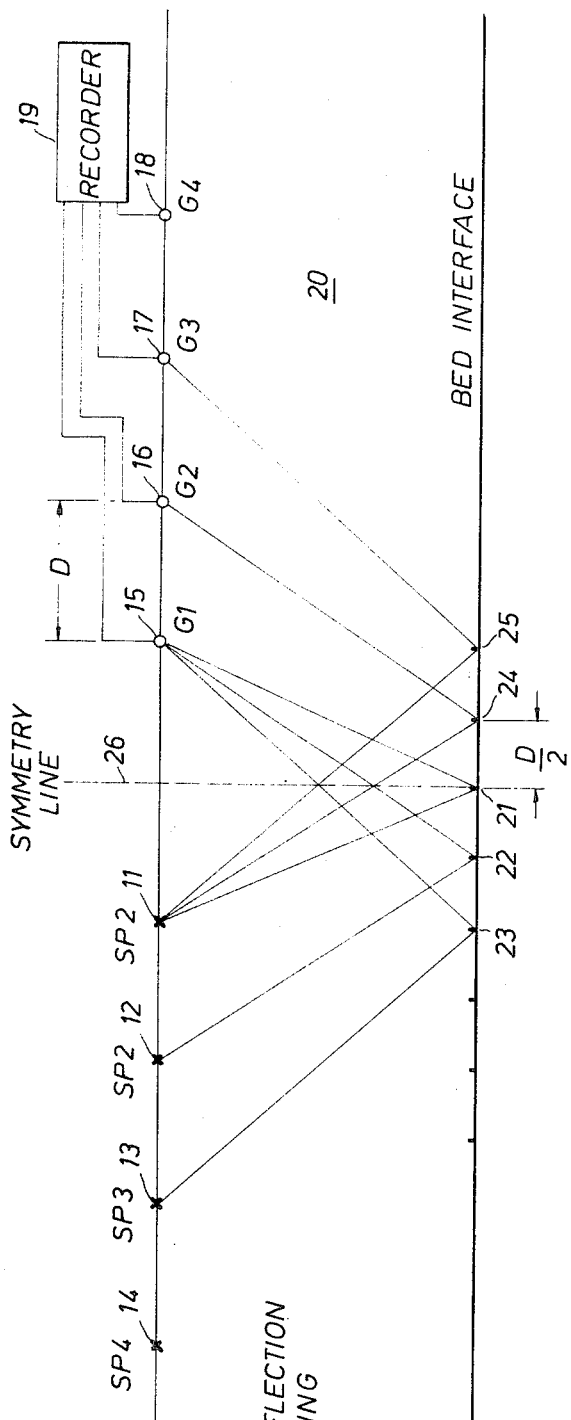
FIG. 1 is a schematic view showing the shot point geometry of the prior art common reflection point seismic method.

Referring initially to FIG. 1, the present invention may be explained by reference to the shot point geometry of the prior art seismic exploration method known as common reflection point or common depth point shooting. FIG. 1 illustrates this prior art shot point geometry. For the sake of simplicity it is assumed in the illustrations of FIG. 1, and as will be discussed subsequently FIG. 2, that only one subsurface earth formation interface exists and that the surface of the earth is flat and parallel to the bed interface of the subsurface earth formation being investigated. In practice it will be realized, of course, that the subsurface geometry may be many times more complex than this.

In the prior art common reflection point method, a plurality of shot point locations, 11, 12, 13 and 14, for example, are located symmetrically about a line of symmetry 26. Symmetry line 26 falls between the shot points and the geophone or seismometer locations 15, 16, 17, and 18 for the case of flat, parallel plane surfaces as illustrated in the simplified model of FIG. 1. In practice it will be appreciated that while only one phone is shown at the various geophone locations, that a plurality of geophones can be used (in a geometric array if desired) to reduce the effects of surface noise. The principal aim of the common reflection point method is to reflect seismic energy from the different shot point locations off essentially the same points or same small areas (21, 22, 23, 24, 25 of FIG. 1, for example) of the subsurface bed interface order investigation. The energy reflected from these points is then detected or sensed by the seismometers $G_1$, $G_2$, $G_3$, $G_4$, etc. situated at the locations 15, 16, 17 and 18.

For ease of illustration, only four shot point and geophone locations are shown. It will be known to those skilled in the art that in practice six, 12, or 24, or in fact any number of geophones and shot points may be used in common reflection point shooting, depending on the degree of accuracy or redundancy desired. If it is assumed that the velocity of propogation of acoustic energy in the media 20 is continuous over the spatial interval encompassing all shot points and geophone locations and if the geometry is as shown in FIG. 1, then the symmetrical location of the shot points and geophones about the line of symmetry 26 results in principal paths (or so-called ray paths) of acoustic energy as illustrated. For example, if the seismic energy from shot point 11 traverses the ray path 11, 21, 15, it is sensed at the seismometer or detector $G_1$. Similarly, seismic energy from shot point 2, which is fired at a different time from the firing at shot point 1, traverses a path to geophone $G_2$ (at location 16) over a ray path 12, 21, 16. This conclusion is reached as a result of applying the laws of reflection of acoustic energy at the interface between the subsurface beds. Moreover, energy from earlier or later shots located at shot points 3 and 4 (following the paths 13, 21, 17 for the case of shot point 3 and 14, 21, 18 for the case of shot point 4) are all reflected from point 21 at the bed interface of the subsurface formation. Thus, four shots at shot points 1, 2, 3, and 4 of FIG. 1 produce four reflections which are received at four geophones $G_1$, $G_2$, $G_3$ and $G_4$, all of which had been reflected from a common depth point or the same small area of the bed interface 21. Recorder 19 records signals from the geophones as a function of time. By repeating shots at other analogously placed shot points and receiving reflections at analogously placed geophone locations, fourfold redundant data may be gathered from each reflection point.

The common reflection point shooting technique then assumes that the data reflected from the same or common depth point, as for example, point 21, is in some sense related and thus may be algebraically combined, as for example by addition, to yield an enhanced signal to noise ratio for the true seismic energy reflected from the subsurface bed interface being examined. It is further assumed that noise, being of a random (or at least less consistent) nature, will be disenhanced or dispersed by the averaging or addition technique.

It will be appreciated by those skilled in the art that before the averaging technique is applied that the seismic data must be corrected for "moveout". Moveout is the apparent time shift of seismic events at horizontally spaced geophone locations caused by the horizontal spacing of the geophones and the finite velocity of the acoustic energy. There are many schemes known in the art for doing this. Moveout methods will not be discussed herein. It will suffice to say that whenever the averaging or spatial filtering technique is discussed it is assumed that the data has been corrected for moveout.

As previously discussed, ray paths for seismic energy detected at the seismometers $G_1$, $G_2$, $G_3$, $G_4$ may be traced for various combinations of shot points and geophone or seismometer locations, as for example the other paths shown in FIG. 1. The resultant common depth points or common reflection points on the subsurface bed interface being investigated (if the geophones $G_1$, $G_2$, $G_3$, and $G_4$ are located respectively a distance D apart) are a series of subsurface reflection points 21, 22, 23, 24, 25 etc. which are located a distance D/2 apart.

It will be noted that using the common depth point or common reflection point scheme of gathering seismic data that the reflection points on the bed interface in question are generally a relatively long distance apart. This results from the practical consideration that in order to cover ground the shot points and geophones are located a relatively long distance D apart, typically, 200 to 300 feet. In cases of practical interest this can result in the undesired gathering of noise data due to the phenomenon of aliasing because of the relatively sparse locations of the data points on the subsurface bed interface being investigated.

Referring now to FIG. 5, the phenomenon of spatial aliasing is illustrated schematically. It is well known that a surface wave will be generated in the layer of earth's media nearest the surface from the release of the energy for producing the seismic disturbance. This surface wave will have components of energy in the vertical direction which may be sensed, for example, by the seismometers or geophones located at locations 15, 16, 17 and 18 1. Points FIG. 1.Points 15, 16, 17, and 18 in FIG. 5 correspond to the same numbered points in FIG. 1. If the frequency content of the surface wave is sufficiently high, it may have an overall wave shape such as that shown by the solid line wave in FIG. 5 of wave length $\lambda$. The geophone locations, on the other hand, are in this case located more than one wave length $\lambda$ of the surface wave apart, i.e., here $D>\lambda$. Therefore, for any given instant of time the geophones located at 15, 16, 17 and 18 may sample amplitude characteristics of the surface wave in the manner shown in FIG. 5 by the circled points. In this example, the seismometer at location 15 may sample a slightly negative amplitude characteristic value. The seismometer at location 16 may sample a slightly more negative value than that at 15. That at location 17 may sample nearly the same negative value as that at location 15. Finally, the seismometer at location 18 may sample a slightly positive value. This data sampling would seemingly imply that a surface wave having a wave length similar to that shown by the dotted line curve in FIG. 5 could be present. It is thus apparent that because of the spacing distance D of the geophones being greater than the wave length $\lambda$ of the traveling surface wave that a false impression has been created. This effect is known as aliasing. Aliasing can result in apparent wave length stretching, phase shift, wave fold back or other apparent distortion of the data.

It is apparent from the example of FIG. 5 that whenever the sampling distance D is greater than one-half the wave length $\lambda$ of the traveling surface disturbance, for example, that the possibility exists that the surface disturbance will be incorrectly interpreted due to the aliasing phenomena. With the use of the present invention it is possible to achieve, using the same number of seismic shots or energy generations, a much denser or closely spaced field of investigation on the subsurface bed being investigated than is possible using the common reflection point or common depth point technique. This can be used to advantage in overcoming aliasing as will be described.

Figure 2:
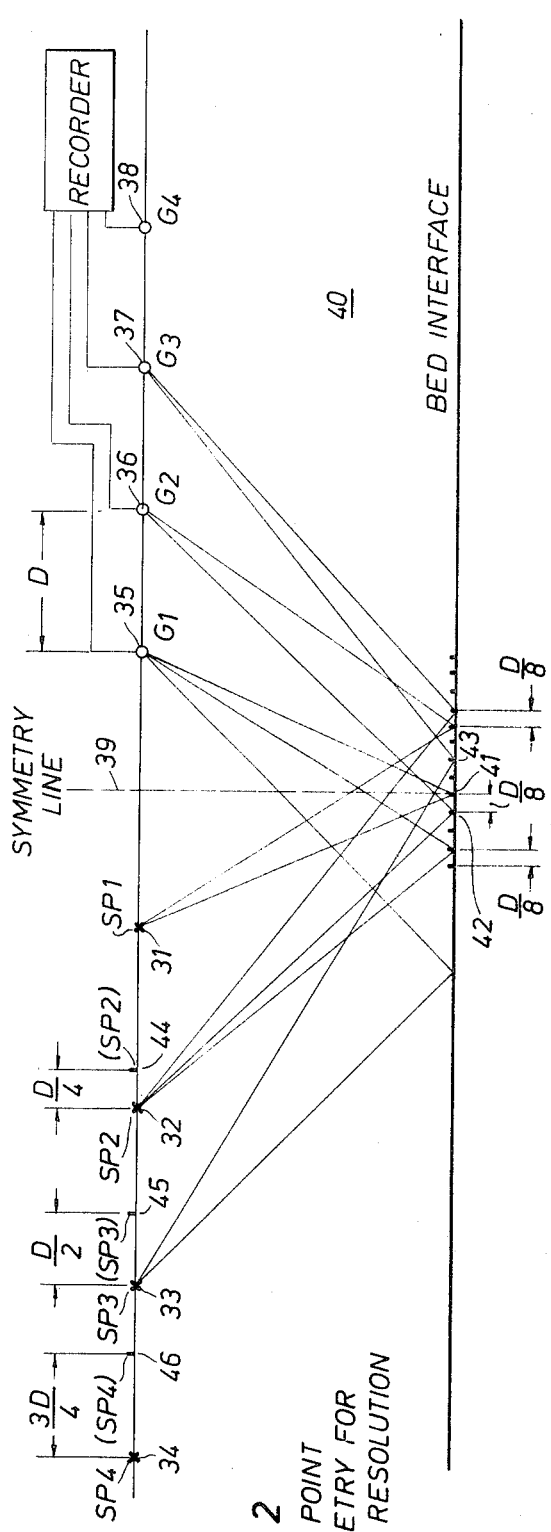
FIG. 2 is a schematic view showing one example of shot point geometry in the practice of the present invention.

Referring now to FIG. 2, a simplified sketch of the shot point geometry in accordance with the present invention is shown. In the example of FIG. 2, again it is assumed for simplicity that the surface of the earth is flat and that the bed interface being investigated is also flat and parallel to the earth's surface. Again geophones or seismometers $G_1$, $G_2$, $G_3$, $G_4$ are located at locations 35, 36, 37 and 38, spaced equally a distance D apart. The seismometer $G_1$ is spaced a distance D from the line of symmetry 39. The initial shot point in a sequence of shots is at location 31. This is located a distance D to the left of the line of symmetry 39. However, in the present invention, shot point 2, instead of being located a distance D to the left of shot point 1 (i.e., at location 44 of FIG. 2 which would be its common depth point location) is instead located at point 32 a distance D + D/4 to the left of shot point 1. Shot point 3 is located a distance D + D/4 to the left of the location of shot point 2 (32 of FIG. 2) and thus falls at location 33 of FIG. 2 rather than at location 45 (which would be the location of shot point 3 in the common reflection point technique.) Finally, shot point 4, which completes a shot sequence analogous to the fourfold redundant common reflection point technique of FIG. 1, is located a distance D + 3D/4 to the left of the psuedo (common depth point) location point 45 of shot point 3. Thus in the technique of the present invention (in the case of fourfold redundancy shooting corresponding to the fourfold redundance common reflection point shooting illustrated in FIG. 1) the sequence for shot point locations is D/4, 2D/4, 3D/4, to the left of each analogous common depth point shot location. For $n$-fold redundant shooting the locations of shot points would be $D/n$, $2D/n$ - - - , $(n-1) D/n$ from the corresponding analogous $n$-fold CDP shot location.

The result of locating the shot points in this manner is to produce a relatively closely spaced series of reflection points on the subsurface bed interface being investigated. For example, the seismic energy generated by the first shot at shot point 1 and detected by geophone $G_1$ at location 35 follows the ray path 31, 41, 35. A reflection point is established on the subsurface bed interface at 41. Energy from the same shot, reaching geophone $G_3$ at location 37 traverses a ray path 31, 43, 37. Energy from the second shot (located at 32), rather than traversing the common depth point 41 in reaching geophone $G_2$ at location 36, traverses the path 32, 42, 36. Here point 42 is located a distance D/8 to the left of point 41. This is due to the displacement of shot point 2 (located at 32) from its psuedo (or corresponding CDP location, 44). Using this spacing technique it may be shown that a plurality of reflection points each spaced a uniform distance D/8, for example, on the subsurface interface may be produced. It will be understood that this technique may be used to obtain even more densely spaced reflection points. For example, if it is desired to use spacing analogous to sixfold CDP shooting, then using the method of the present invention spacings would be D + D/6 apart (for those after the first shot) and would yield reflection points D/12 apart on the subsurface interface being investigated.

According to the principles of the present invention, the data gathered from these finitely spaced reflection points on the subsurface bed interface are then combined by improved techniques to produce an enhanced data record. It is apparent from the geometry of FIG. 2 that if all of the ray paths are traced from the various shot points to each of the geophones in FIG. 2 a succession of reflection points spaced a distance D/8 apart on the subsurface bed interface are produced. The energy from each of the shots has traversed a path through each of these points on its way to the geophones and no energy has passed through the same points or substantially the same points as in the case of the common reflection point technique. These systematically spaced reflection points are, however, spatially related to each other on the subsurface bed interface so as to be combinable according to techniques to be subsequently described. Such combination or processing can enhance the signal to noise ratio of the data in a manner analogous to that of the common reflection point technique while at the same time providing a high resolution, closely spaced image of the subsurface bed interface being investigated.

Referring now to FIGS. 3 and 4, the combination of the data to enhance its signal to noise ratio as done in the prior art common depth point technique and with the method of the present invention are contrasted. In FIG. 3 which could correspond to the example shown in FIG. 1, four separate seismic traces resulting from energy passing through each common reflection point on the subsurface formation are available. These are illustrated schematically by the four curves 51, 52, 53, and 54, for example, on FIG. 3. These data curves which have resulted from energy passing through the same point are then combined by algebraically adding the four curves together. It is assumed that noise will appear as more or less random variations on each of the four traces and will then cancel while the true signal resulting from the reflection of seismic energy at the common depth point will be systematic in nature and will be enhanced when the four traces are added together. Thus a resulting trace 55 is obtained in which the reflection from the subsurface bed indicated by the peak 56 on the curve is much enhanced and stands out over the surrounding noise on the trace.

Now referring to FIG. 4, a similar and yet much more powerful function may be performed to enhance the signal to noise ratio of the data gathered from the shot point geophone location procedure of the present invention. In this case the record of FIG. 4 may be thought of as a multiplicity of traces 61, 62, 63, 64, 65, 66, 67 etc. each generated by a separate but systematically spaced reflection point or data point located on the subsurface bed interface in question. Assuming that the moveout correction has been made, then according to the present invention the resultant signals 61, 62, etc. may be combined by means of a spatial filter in order to enhance the signal to noise ratio.

It will be appreciated by those skilled in the art that while FIG. 2 has illustrated a method for achieving a systematic variation in the location of subsurface reflection points or data points by monotonically increasing the shot point spacing, that using the data enhancement techniques to be described, this systematic variation of shot points is not required. It may, for example because of terrain, be impossible or difficult to place shot points in this manner. In this case the data enhancement techniques to be described would be equally applicable to nonuniform or non-systematically spaced reflection point data provided the relative shot point/geophone location is such as to provide reasonable proximity of the reflection points or data points to each other on the subsurface interface being investigated.

The spatial filtering technique of the present invention is a means of averaging over the spatial dimension data resulting from reflections of acoustic energy from associated points on the subsurface bed interface being investigated. If, as is assumed in the common reflection point technique, the data resulting from reflected energy arriving from adjacent longitudinally spaced subsurface points to geophones (after being corrected for moveout) is in some sense associated, and if the noise source is more random in nature than the data source, then the signal to noise ratio of such data may be enhanced by an averaging technique. In the case of the common reflection point data, as previously discussed, the averaging technique is simply addition of the signals.

Figure 6A:
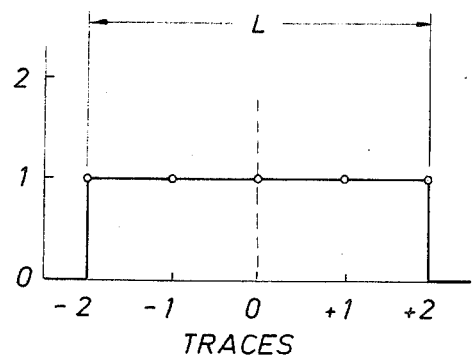
FIGS. 6A, 6C, and 6E are graphical illustrations of spatial filter operators useable in practicing the present invention.

Referring now to FIG. 6A, a spatial filter operator is shown which corresponds to the averaging operator of the common depth point or common reflection point seismic method. The vertical scale of FIG. 6A, is taken as being indicative of the weight or effect of the data applied to the average by each of the data points. The horizontal scale represents the location of the reflection point or data point in the spatial dimension. The filter operator expressed in the space domain is applied to the data resulting from energy reflections arriving from the spaced points labeled −2, −1, 0, +1, and +2 in FIG. 6A by taking the value of the data curve at the time and space point in question, multiplying it by the weight function of the filter operator at that space point and summing this with the results of the same operation performed on the data from each of the other space points of the space domain operator. The resultant is then associated with the space location falling at location 0 of the operator of FIG. 6A. The operator is then shifted to the next space location to be operated on (i.e., this point is placed at location 0 of FIG. 6A) and the entire process is repeated. In applying the operator of FIG. 6A, for example, to the traces of FIG. 3 for CDP gathered data, (assuming that there are fivefold CDP data present on the record for convenience) the curves 51, 52, 53, 54 and 55 would correspond to the data taken at the trace operator's data points labeled −2, −1, 0, 1, and 2. Each data value on a curve would be multiplied by the weighting factor (1, in this case) and then summed together. The resulting trace is then associated with the point located in the center of the space domain operator. It is evident that this process is equivalent to simply adding all the curves together as previously described in processing CDP data.

When applied to seismic data obtained by the method of the present invention and represented, for example, by the traces of FIG. 4, the FIG. 6A spatial filter operator would, for example, take data at corresponding times from curves 61, 62, 63, 64, 65 and sum these data together for all corresponding times. The resultant curve would thus represent spatially filtered data occurring at the space dimension location of the curve 63 of the data record. It will be recalled that in the method of the present invention, the reflection points from the subsurface bed interface being investigated are in general located much closer together than points obtained by the common depth point technique. This permits the removal of noise in a more effective manner than previously possible because the effect of spatial aliasing is much diminished. Moreover, more elaborate spatial filtering techniques may be applied to the data if desired.

Figure 6B:
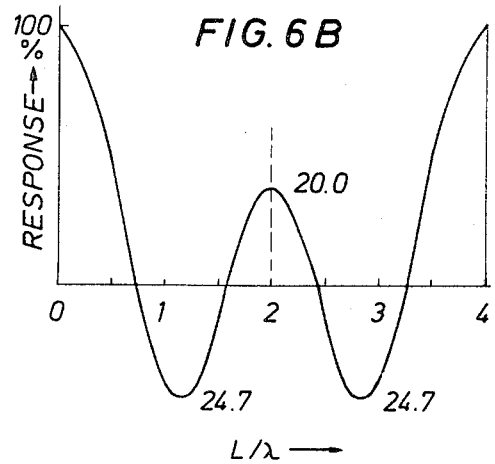
FIGS. 6B, 6D, and 6F are graphical illustrations of the effect on data of the operators of FIGS. 6A, 6C, and 6E.

The type of space domain operator illustrated in FIG. 6A is a linear operator in the sense that contributions from an arbitrarily wide region (determined by L, the width of the filter operator) are assumed to equally effect the filtered or resultant trace which occurs at the center of the operator and to contribute equal amounts to the resultant trace produced by the operator. If the effect of this type of linear averaging on data of a sinusoidal nature is examined mathematically, a resultant curve such as that shown in FIG. 6B is obtained. The curve of FIG. 6B is obtained by taking the Fourier transform of the space domain operator of FIG. 6A. That is, if the space domain operator is represented by $f(x)$, where $x$ is the spatial dimension along the line of the geophone and shot point locations, then the Fourier transform $F(w)$ of this space domain function $f(x)$ is given by:

$$F(W) = \int_{-\infty}^{+\infty} f(x) e^{iWx} dx = \int_{-L/2}^{L/2} f(x) e^{iWx} dx \quad (1)$$

where $W = 2\pi/\lambda$ and $\lambda$ is the wave length of the sinusoidal wave.

By taking the Fourier transform of the space domain operator and observing it in the wave length domain, the effect of the space domain operator on sinusoidal type functions of various wave lengths may be easily observed. (It may be assumed that most seismic data will fall into this class of functions.) The percentage of contribution of a given point to the resultant of the space domain operator is plotted as a function of the dimensionless quantity $L/\lambda$ as in FIG. 6B. It is seen that (for a fixed width L of operator) that as long as the wave length of the sinusoid being averaged is long (i.e., $L/\lambda$ small) then the averaging technique is successful. However, as the ratio $L/\lambda$ increases (i.e., as the wave length of the data decreases), for example, it is seen that considerable distortion of data can occur when the linear average operator is used. Going further to the right on the curve of FIG. 6B, it will be observed that for $L/\lambda$ ratios between ¾ and 3/2, a 180° phase shift actually occurs by the application of the space domain filter of FIG. 6A. This is the foldback or aliasing effect previously described. If L is made larger (to better enhance the data by taking more points into account) then aliasing can distort the data even more with the linear average type of spatial filter operator. From this discussion it is apparent that some better form of spatial filter operator than the linear average operator of FIG. 6A, and the prior art CDP method, would be desirable.

Figure 6C:
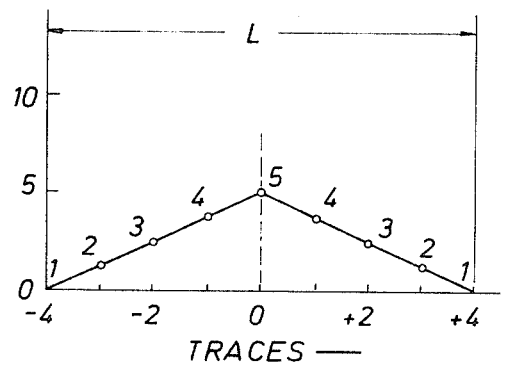

A more desirable space domain filter operator than that illustrated in FIG. 6A is that of FIG. 6C. The space domain operator of FIG. 6C may be though of, for example, as a weighted mix of the data from traces in the vicinity of a central trace corresponding to the 0 point of the horizontal axis of FIG. 6C. The vertical axis of FIG. 6C ascribes a weighting value to be accorded to each surrounding trace. For example, the trace located 4 traces to the left of the 0 point receives a weight of 1. That at 3 traces to the left of the 0 trace receives a weight of 2, etc. The central trace itself receives a weight of 5. The operator of FIG. 6C could operate on the high resolution record data of FIG. 4, for example, simultaneously on 9 traces corresponding to 9 equidistant spaced points on the subsurface bed interface being investigated. In FIG. 4, for example, these could be traces 61 through 69. Again the resultant of the operator is a trace which may be ascribed to the central location (or 0 point) of the operator. The operator 0 point location is moved and the entire operation repeated to obtain continuously enhanced data.

Figure 6D:
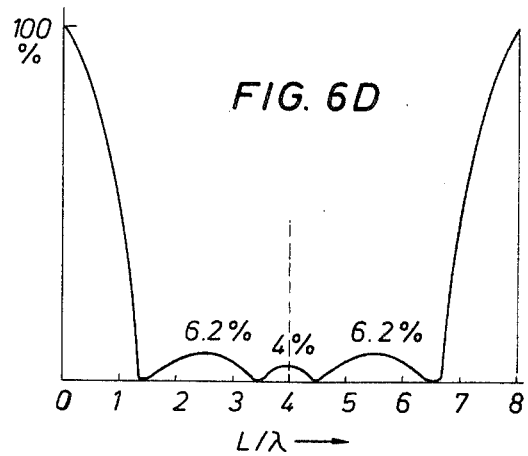

Examining the response of the space domain operator of FIG. 6C (when operating on sinusoidal type functions), the Fourier transform resultant is plotted in the wave length domain in FIG. 6D. It is seen that the operator of FIG. 6C when applied to the data has the effect of substantially smoothing the response as compared to that of the operator of FIG. 6A. In this case it is seen, for example, that for a given L, a shorter wave lengths may be used in the average before distortion occurs. Moreover, in the case of the operator of FIG. 6C, it is seen that no phase reversal occurs at any wave length as is possible in the case of the linear operator of FIG. 6A.

Figure 6E:
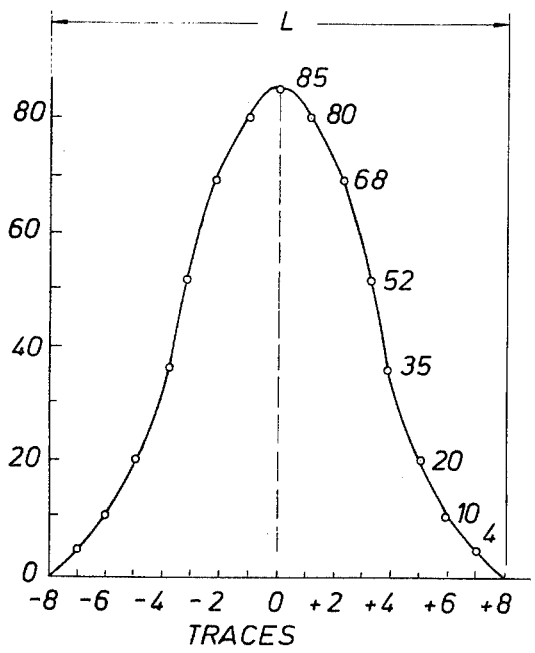
Figure 6F:
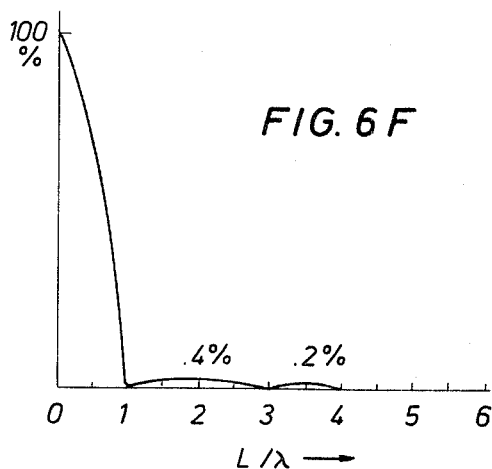

An even more effective space domain operator is illustrated in FIG. 6E. In this case the operator length L has a width of 17 traces as illustrated by the trace numbers −8 to +8 on the horizontal axis of FIG. 6E. The weighting function applied to each of the traces in question is illustrated by the vertical scale in terms of a percentage. Here the 0 point or central point of the operator corresponds to a weight of 85 while traces removed as far as 8 space point locations from the center on either side of the center trace are attributed a weight of only 1 in summing the traces to produce the resultant. The response of this operator in the wave length domain is seen in FIG. 6F. Virtually no distortion is introduced by the short wave lengths ($L/\lambda > 1$) in the use of this operator.

From the discussion of the space domain filters illustrated here, it will be apparent to those skilled in the art that other more complicated space domain filter operators may be used. For example it may be possible to design such operators to perform specific functions if desired. Analog computer circuitry may be used to perform the space domain filter operator functions discussed above. Techniques for implementing such circuitry are known in the seismic art. For example, once the space domain operator is chosen, the spatial filter functions are represented by addition and multiplication. Thus amplifiers may be used which have gains proportional to the weighting function components and analog summing circuits known in the art used to sum the output of a plurality of such amplifiers for performing the spatial filter function on analog field data. Alternatively if the data is digitally recorded in the field, a general purpose digital computer may be programmed to operate on the data at a later time in order to perform the space domain filtering. The general operative scheme of such a program is apparent from the FIGS. 6A, 6C, and 6E. It is important to recall that the space domain filtering or averaging techniques are applicable to the data gathered by the high resolution method of the present invention in a much more useful manner than that applied to the prior art common reflection point shooting data due to the fact that reflection points or data points occur at much closer intervals on the subsurface bed interface being investigated than do the common reflection points. This enables noise of much shorter wave lengths to be filtered from the data without undue interference from the aliasing effect previously discussed.

The examples shown in the drawings are submitted as being illustrative only of the concepts of the present invention. While only four spaced shot points have been illustrated for simplicity in FIGS. 1 and 2, in discussing the geometry of the common reflection point technique and the high resolution data gathering technique of the present invention, it will be appreciated by those skilled in the art that as many shot points and geophone locations as desired may be used. For example, it is standard practice in the common reflection point technique to use six, 12 or even 24 fold redundancy in gathering data points from the common reflection points on the subsurface bed interface being investigated. Similarly, in the present invention, rather than using fourfold separation of the shot points from their pseudo location based on the common reflection point technique, it is possible to use $n$-fold separation to achieve even more closely spaced data reference points on the subsurface bed interface being investigated. Moreover, while shot points have been shown only to the left of geophone locations, it is well known in the art to space geophones on either side of a shot point, and, as the shot points progress to the left, for example, to move portions of the geophone cable from the right end to the left end to perform a continuous survey. Similarly, rather than moving shot points to attain the geometry relationships desired, the geophones may be moved while the shot point is fixed. These same techniques of continuous survey are, of course, applicable to the method of the present invention as long as the basic geometrical relationships for systematically varying the shot point location as illustrated in FIG. 2 are employed in gathering the data. Finally, the data enhancement techniques, particularly with weighted filter operator, may be applicable to data gathered using non-systematically spaced shot points, if desired.

While a particular embodiment of the present invention has been shown and described, it will be appreciated by those skilled in the art that other equivalent techniques may be suggested. It is the aim in the appended claims to cover all such changes and modifications as fall within the true spirit and scope of the present invention.

What is claimed is:

1. A method of obtaining enhanced data in seismic surveying comprising the steps of:
    locating a line of seismometers in longitudinally spaced relation to each other on or near the surface of the earth;
    locating a line of shot points for generating seismic energy on or near the surface of the earth in horizontal spaced relation to each other and a given seismometer in such a manner that seismic energy components reflected from subsurface formation by seismic energy generations located at said shot points do not traverse the same subsurface reflection points for each such energy generation, but rather are reflected from different but relatively closely spaced, associated reflection points in said subsurface formations;
    generating seismic energy at each of the shot point locations;
    receiving reflected components of seismic energy resulting from each such energy generation at each seismometer location and generating electrical signals representative thereof;
    recording said representative signals as a function of time to obtain a plurality of seismic data traces representative of data from said different associated reflection points; and
    processing said seismic data traces by steps including the step of integrating by spatially averaging said data traces corresponding to data from said different but associated reflection points.

2. The method of claim 1 wherein the step of spatially averaging said data traces is performed by linearly averaging said data traces.

3. The method of claim 1 wherein the step of spatially averaging said data traces is performed by a weighted averaging wherein traces more distant from the center of an area of associated traces contribute proportionately less to the average than those nearer the center.

4. A method of obtaining enhanced data in seismic surveying comprising the steps of:
   locating a line of shot points for generating seismic energy in longitudinally spaced relation to each other on or near the surface of the earth;
   locating a line of seismometers in horizontally spaced relation on or near the surface of the earth in such a manner that seismic energy components reflected from subsurface formations by seismic energy generation located at said shot points do not traverse the same subsurface reflection points for each such energy generation, but rather are reflected from different but relatively closely spaced, associated reflection points in said subsurface formations;
   generating seismic energy at each of the shot point locations;
   receiving reflected components of seismic energy resulting from each such energy generation at each seismometer location and generating electrical signals representative thereof;
   recording said representative signals as a function of time to obtain a plurality of seismic data traces representative of data for said different associated reflection points; and
   processing said seismic data traces by steps including the step of integrating by spatially averaging said data traces corresponding to data from said different but associated reflection points.

5. The method of claim 4 wherein the step of spatially averaging said data traces is performed by linearly averaging said data traces.

6. The method of claim 4 wherein the step of spatially averaging said data traces is performed by a weighted averaging wherein traces more distant from the center of an area of associated traces contribute proportionately less to the average than those nearer the center.

* * * * *